(12) United States Patent
Lin et al.

(10) Patent No.: US 10,211,968 B2
(45) Date of Patent: Feb. 19, 2019

(54) SIGNAL PROCESSING METHOD, APPARATUS, AND SYSTEM

(71) Applicant: HUAWEI TECHNOLOGIES CO., LTD., Shenzhen, Guangdong (CN)

(72) Inventors: Huajiong Lin, Chengdu (CN); Bo Han, Chengdu (CN); Linjun Lv, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 14/669,191

(22) Filed: Mar. 26, 2015

(65) Prior Publication Data

US 2015/0200764 A1 Jul. 16, 2015

Related U.S. Application Data

(63) Continuation of application No. PCT/CN2013/075052, filed on May 2, 2013.

(30) Foreign Application Priority Data

Sep. 29, 2012 (CN) .......................... 2012 1 0374967

(51) Int. Cl.
*H04L 5/14* (2006.01)
*H04W 72/04* (2009.01)
(Continued)

(52) U.S. Cl.
CPC ........... *H04L 5/1461* (2013.01); *H04B 1/525* (2013.01); *H04L 5/0057* (2013.01);
(Continued)

(58) Field of Classification Search
CPC ... H04L 5/0053; H04L 5/0073; H04W 52/143
(Continued)

(56) References Cited

U.S. PATENT DOCUMENTS 5,691,978 A 11/1997 Kenworthy
8,725,067 B2 * 5/2014 Ahn .................... H04B 7/15542
455/11.1

(Continued)

FOREIGN PATENT DOCUMENTS

CN 1547414 11/2004
CN 2009/056410 A1 5/2009
(Continued)

OTHER PUBLICATIONS

International Search Report dated Aug. 8, 2013 in corresponding International Patent Application No. PCT/CN2013/075052.
(Continued)

*Primary Examiner* — Asad M Nawaz
*Assistant Examiner* — Jason A Harley
(74) *Attorney, Agent, or Firm* — Staas & Halsey LLP

(57) ABSTRACT

Embodiments of the present invention disclose a signal processing method, apparatus, and system, where the method includes: receiving a downlink signal that carries an uplink signal; and performing first interference cancellation on the uplink signal by using an estimated self-interference signal, so that a remaining amount of interference of the uplink signal is less than a first interference threshold, thereby minimizing out-of-band interference of the uplink signal on the downlink signal without using a plurality of radio frequency front-ends or without using a duplexer on a same radio frequency front-end. In the embodiments of the present invention, no duplexer is adopted, and therefore, difficulty and a cost of base station and system layout can be reduced, and extra energy consumption of a mobile terminal can also be reduced.

16 Claims, 9 Drawing Sheets

(51) Int. Cl.
  *H04B 15/00* (2006.01)
  *H04B 17/345* (2015.01)
  *H04B 1/525* (2015.01)
  *H04L 5/00* (2006.01)
  *H04W 52/02* (2009.01)

(52) U.S. Cl.
  CPC ... *H04W 52/0212* (2013.01); *H04W 72/0486* (2013.01); *Y02D 70/00* (2018.01); *Y02D 70/1222* (2018.01); *Y02D 70/1224* (2018.01); *Y02D 70/1262* (2018.01); *Y02D 70/146* (2018.01); *Y02D 70/40* (2018.01)

(58) Field of Classification Search
  USPC ......................................................... 370/278
  See application file for complete search history.

(56) References Cited

U.S. PATENT DOCUMENTS

| | | |
|---|---|---|
| 2007/0217488 A1 | 9/2007 | Smaini et al. |
| 2008/0198772 A1 | 8/2008 | Loh |
| 2010/0034077 A1* | 2/2010 | Ishii .................. H04J 11/00 370/210 |
| 2010/0087221 A1* | 4/2010 | Srinivasan ............ H04W 16/08 455/522 |
| 2010/0150032 A1* | 6/2010 | Zinser .................... H04B 1/525 370/277 |
| 2010/0323746 A1* | 12/2010 | Zhang ................ H04W 52/225 455/522 |
| 2011/0143655 A1* | 6/2011 | Ahn ................... H04B 7/15542 455/9 |
| 2012/0008591 A1 | 1/2012 | Miki et al. |
| 2012/0201153 A1* | 8/2012 | Bharadia ................ H04B 1/525 370/252 |
| 2012/0201173 A1* | 8/2012 | Jain ........................ H04B 1/525 370/277 |
| 2013/0044621 A1* | 2/2013 | Jung .................... H04W 72/082 370/252 |
| 2013/0194864 A1* | 8/2013 | Bandic ................ G11C 11/5678 365/185.03 |
| 2013/0194984 A1* | 8/2013 | Cheng ................ H04W 72/082 370/294 |
| 2013/0197984 A1* | 8/2013 | Bhatt ................ G06Q 30/0207 705/14.16 |
| 2013/0286903 A1* | 10/2013 | Khojastepour ........... H04L 5/14 370/280 |
| 2013/0301487 A1* | 11/2013 | Khandani ............. H04W 16/14 370/278 |
| 2013/0301488 A1* | 11/2013 | Hong ...................... H04B 1/56 370/278 |

FOREIGN PATENT DOCUMENTS

| | | |
|---|---|---|
| CN | 101754480 | 6/2010 |
| CN | 201608908 | 10/2010 |
| EP | 1 835 630 A1 | 9/2007 |
| WO | 2010/084866 A1 | 7/2010 |
| WO | 2011/148341 A1 | 12/2011 |

OTHER PUBLICATIONS

Chinese Office Action dated May 4, 2016 in corresponding Chinese Patent Application No. 201210374967.7.
Extended European Search Report dated Sep. 16, 2015 in corresponding European Patent Application No. 13842190.4.
PCT International Search Report dated Aug. 8, 2013 in corresponding International Patent Application No. PCT/CN2013/075052.
Hong et al., "Picasso: Flexible RF and Spectrum Slicing", SIGCOMM'12, Aug. 13-17, 2012, Helsinki, Finland, 12 pp.

* cited by examiner

SIGNAL PROCESSING METHOD, APPARATUS, AND SYSTEM

CROSS-REFERENCE TO RELATED APPLICATIONS

This application is a continuation of International Application No. PCT/CN2013/075052, filed on May 2, 2013, which claims priority to Chinese Patent Application No. 201210374967.7, filed on Sep. 29, 2012, both of which are hereby incorporated by reference in their entireties.

TECHNICAL FIELD

Embodiments of the present invention relate to the field of communications technologies, and in particular, to a signal processing method, apparatus, and system.

BACKGROUND

To implement asynchronous receiving and sending of signals on a plurality of frequency bands, generally, each frequency band corresponds to a radio frequency front-end. If a same radio frequency front-end is used to perform asynchronous receiving and sending on different frequency bands, a saturated analog-to-digital converter (ADC) of a receiving channel is caused. For example, maximum power of a transmit signal is 30 dBm, and power of a received signal is −90 dBm to −50 dBm. Although a self-interference signal and the received signal are on different frequency bands, the ADC includes signals that are on all frequency bands to perform sampling. Therefore, the received signal is submerged in noise because of the self-interference signal.

FIG. 1 is an architectural diagram of a signal processing system in the prior art. As shown in FIG. 1, a duplexer is used at a radio frequency front-end to separate a transmit signal from a received signal, so as to weaken, as much as possible, a self-interference signal that the transmit signal leaks, in an out-of-band way, to a frequency band of the received signal.

However, a technology for separating a transmit signal and a received signal based on a duplexer has the following problems: For example, a cavity duplexer used by a base station has characteristics of a large volume and a high cost, which increases difficulty and a cost of system layout; for another example, a dielectric duplexer used by a mobile terminal has a characteristic of high energy consumption, which significantly deteriorates receiving quality for receiving a downlink signal.

SUMMARY

Embodiments of the present invention provide a signal processing method, apparatus, and system, which can minimize out-of-band interference of an uplink signal on a downlink signal without using a plurality of radio frequency front-ends or without using a duplexer on a same radio frequency front-end, can reduce difficulty and a cost of base station and system layout, and can also reduce extra energy consumption of a mobile terminal.

According to a first aspect, an embodiment of the present invention provides a signal processing method, including:

receiving a downlink signal that carries an uplink signal; and performing first interference cancellation on the uplink signal by using an estimated self-interference signal, so that a remaining amount of interference of the uplink signal is less than a first interference threshold.

In a first possible implementation manner, after the performing first interference cancellation on the uplink signal by using an estimated self-interference signal, the method further includes:

performing, by using an estimated remaining self-interference signal, second interference cancellation on the remaining amount of interference of the uplink signal that is obtained after the first interference cancellation, so that a remaining amount of interference of the uplink signal is less than a second interference threshold.

Based on the first aspect and the first possible implementation manner, in a second possible implementation manner, the method further includes:

obtaining positions of a subcarrier and a resource block RB that are corresponding to the downlink signal, where the positions of the subcarrier and the resource block RB that are corresponding to the downlink signal are dynamically allocated by a physical layer according to current uplink and downlink load and/or a type corresponding to uplink and downlink signals and/or channel quality information; and obtaining, by reading on the subcarrier corresponding to the downlink signal and according to the position of the resource block RB corresponding to the downlink signal, the downlink signal from a downlink signal that is obtained after the first or the second interference cancellation.

According to a second aspect, an embodiment of the present invention provides a signal processing apparatus, including:

a receiving module, configured to receive a downlink signal that carries an uplink signal; and a first cancelling module, configured to: on a basis of the downlink signal that carries the uplink signal and is received by the receiving module, perform first interference cancellation on the uplink signal by using an estimated self-interference signal, so that a remaining amount of interference of the uplink signal is less than a first interference threshold.

In a first possible implementation manner, the apparatus further includes:

a second cancelling module, configured to: on a basis that the first cancelling module performs the first interference cancellation on the uplink signal by using the estimated self-interference signal, perform second interference cancellation on the remaining amount of interference of the uplink signal by using an estimated remaining self-interference signal, so that a remaining amount of interference of the uplink signal is less than a second interference threshold.

Based on the first aspect and the first possible implementation manner, in a second possible implementation manner, the apparatus further includes:

an obtaining module, configured to obtain positions of a subcarrier and a resource block RB that are corresponding to the downlink signal, where the positions of the subcarrier and the resource block RB that are corresponding to the downlink signal are dynamically allocated by a physical layer according to current uplink and downlink load and/or a type corresponding to uplink and downlink signals and/or channel quality information; and a reading module, configured to obtain, by reading on the subcarrier corresponding to the downlink signal and according to the position, which is obtained by the obtaining module, of the resource block RB corresponding to the downlink signal, the downlink signal from a downlink signal that is obtained after the first cancelling module or the second cancelling module performs interference cancellation, where:

the first cancelling module includes a radio frequency interference canceller; and the second cancelling module includes a digital interference canceller.

According to a third aspect, an embodiment of the present invention provides a communications device, including a base station or a mobile terminal, where:

the base station includes the foregoing signal processing apparatus; and the mobile terminal includes the foregoing signal processing apparatus.

In the embodiments of the present invention, according to a technical means that when a downlink signal that carries an uplink signal is received, first interference cancellation is performed on the uplink signal by using an estimated self-interference signal, so that a remaining amount of interference of the uplink signal is less than a first interference threshold, out-of-band interference of the uplink signal on the downlink signal can be minimized without using a plurality of radio frequency front-ends or without using a duplexer on a same radio frequency front-end. In the embodiments of the present invention, no duplexer is adopted, and therefore, difficulty and a cost of base station and system layout can be reduced, and extra energy consumption of a mobile terminal can also be reduced.

In addition, in the embodiments of the present invention, a physical layer can dynamically allocate and adjust uplink and downlink bandwidth according to current uplink and downlink load of a system and/or a type corresponding to uplink and downlink signals and/or channel quality information. However, in a method for separating a transmit signal from a received signal based on a duplexer, the duplexer can be applied only to fixed uplink and downlink bandwidth. Therefore, according to the technical solutions provided in the embodiments of the present invention, out-of-band interference of an uplink signal on a downlink signal can be minimized, and uplink and downlink bandwidth can also be dynamically allocated and adjusted, thereby expanding an application scope of an existing system, and improving application flexibility of the system.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various wireless communications systems, for example, a Global System for Mobile Communications (GSM), a General Packet Radio Service (GPRS) system, a Code Division Multiple Access (CDMA) system, a CDMA2000 system, a Wideband Code Division Multiple Access (WCDMA) system, a Long Term Evolution (LTE) system, a World Interoperability for Microwave Access (WiMAX) system, or the like.

Figure 1:
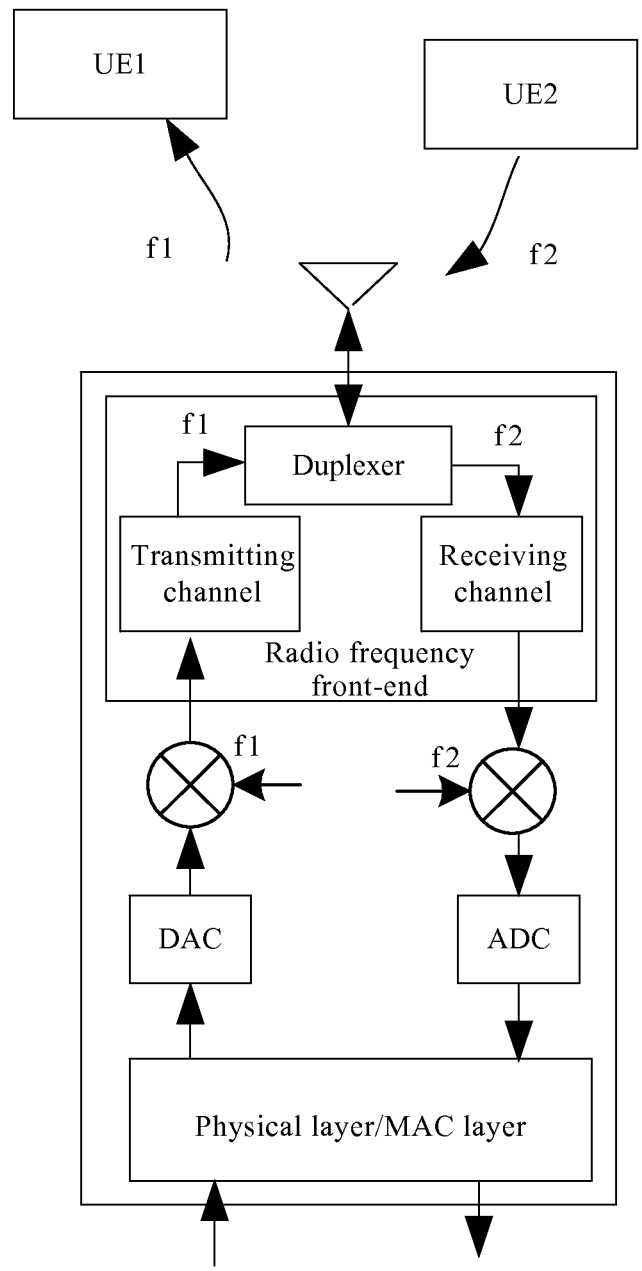
FIG. 1 is an architectural diagram of a signal processing system in the prior art.
Figure 2:
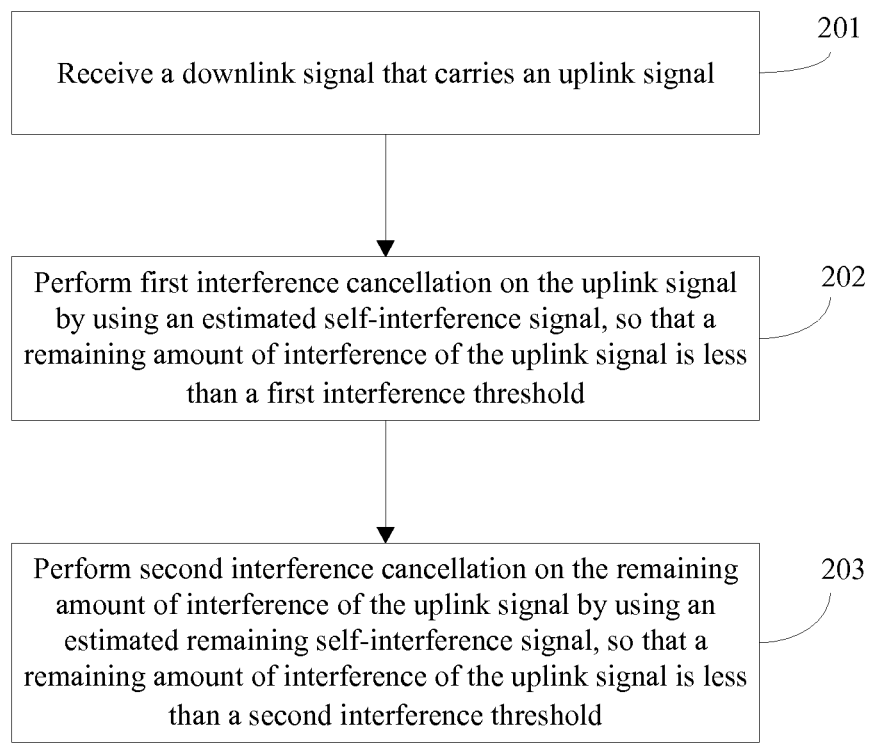
FIG. 2 is a schematic flowchart of a signal processing method according to an embodiment of the present invention.

FIG. 2 is a schematic flowchart of a signal processing method according to an embodiment of the present invention. As shown in FIG. 2, the signal processing method in this embodiment may include:

201. Receive a downlink signal that carries an uplink signal.

Figure 3:
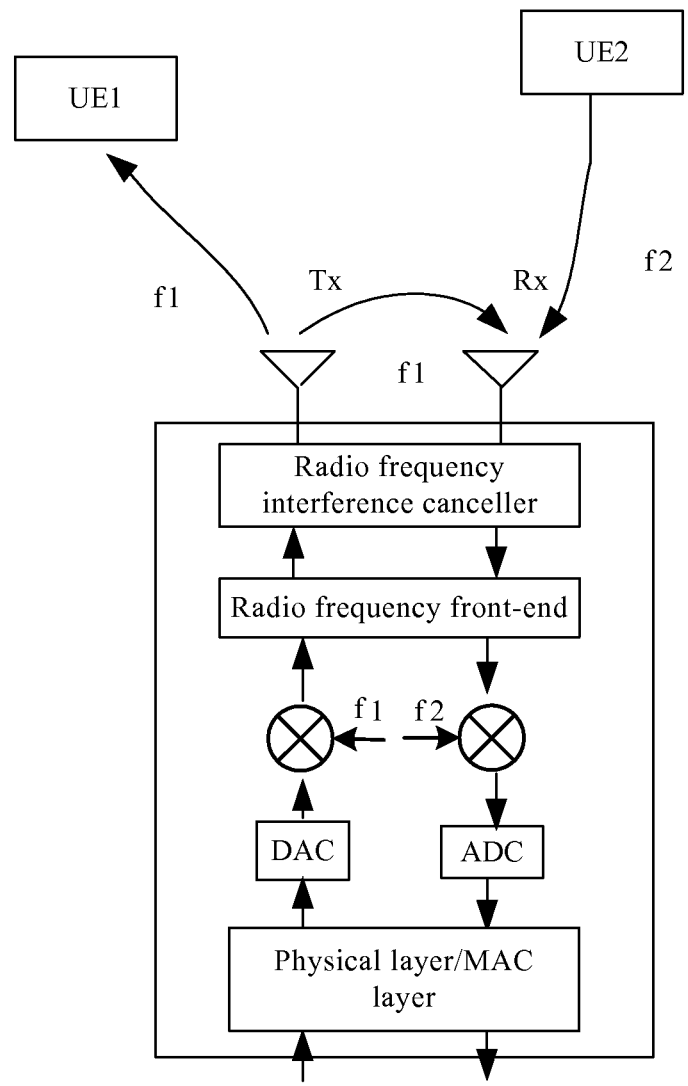
FIG. 3 is an architectural diagram of a system applied in an embodiment of the signal processing method shown in FIG. 2.

FIG. 3 is an architectural diagram of a system applied in an embodiment of the signal processing method shown in FIG. 2. As shown in FIG. 3, each of a receiving channel and a sending channel uses one antenna, the system bears an uplink signal Tx on a carrier that is at a frequency f1 to perform transmitting, and bears a downlink signal Rx on a carrier that is at a frequency f2 to perform receiving. Because a same radio frequency front-end is used to perform asynchronous receiving and sending of uplink and downlink signals on different carriers, a self-interference signal generated when the uplink signal is transmitted is carried in the received downlink signal, where the self-interference signal generated when the uplink signal is transmitted is an uplink signal.

202. Perform first interference cancellation on the uplink signal by using an estimated self-interference signal, so that a remaining amount of interference of the uplink signal is less than a first interference threshold.

In an optional implementation manner of the present invention, as shown in FIG. 3, a radio frequency interference canceller may be used to perform interference cancellation on the downlink signal that carries the uplink signal. Specifically, the radio frequency interference canceller may perform the first interference cancellation on the uplink signal by using the estimated self-interference signal, so that the remaining amount of interference of the uplink signal is less than the first interference threshold. During specific implementation, the radio frequency interference canceller may estimate the self-interference signal by using the uplink signal received on an analog input interface of the radio frequency interference canceller. For example, the radio frequency interference canceller may use a frequency-domain model to effectively estimate the self-interference signal (that is, radio frequency interference) of the uplink signal on the downlink signal, and then perform the first interference cancellation on the uplink signal by using the estimated self-interference signal. For example, when the downlink signal that carries the uplink signal is received, according to a principle of interference cancellation, a signal with a frequency close to estimated frequency corresponding to the estimated self-interference signal is invalid. In other words, the frequency corresponding to the uplink signal is close to the estimated frequency corresponding to the estimated self-interference signal, and therefore, the radio frequency interference canceller cannot transmit the uplink signal to the radio frequency front-end, that is, the uplink signal can be eliminated from the received downlink signal.

It should be noted that, in an actual application, because the estimated self-interference signal can only be close to the uplink signal, the self-interference signal of the uplink signal on the downlink signal can only be minimized by using the radio frequency interference canceller.

It should be noted that, when the first interference threshold is specifically set, for example, when a power value of the remaining amount of interference of the uplink signal is less than a saturation value of an analog-to-digital converter ADC, the remaining amount of interference is set as the first interference threshold.

When the remaining amount of interference of the uplink signal that is obtained after the first interference cancellation is less than the first interference threshold, it can be determined that a communication requirement is met, and a receiving link can work properly.

In an optional implementation manner of the present invention, if the system has a higher requirement for an interference indicator, the method may further include step 203, which is specifically:

203. Perform second interference cancellation on the remaining amount of interference of the uplink signal by using an estimated remaining self-interference signal, so that a remaining amount of interference of the uplink signal is less than a second interference threshold.

Figure 4:
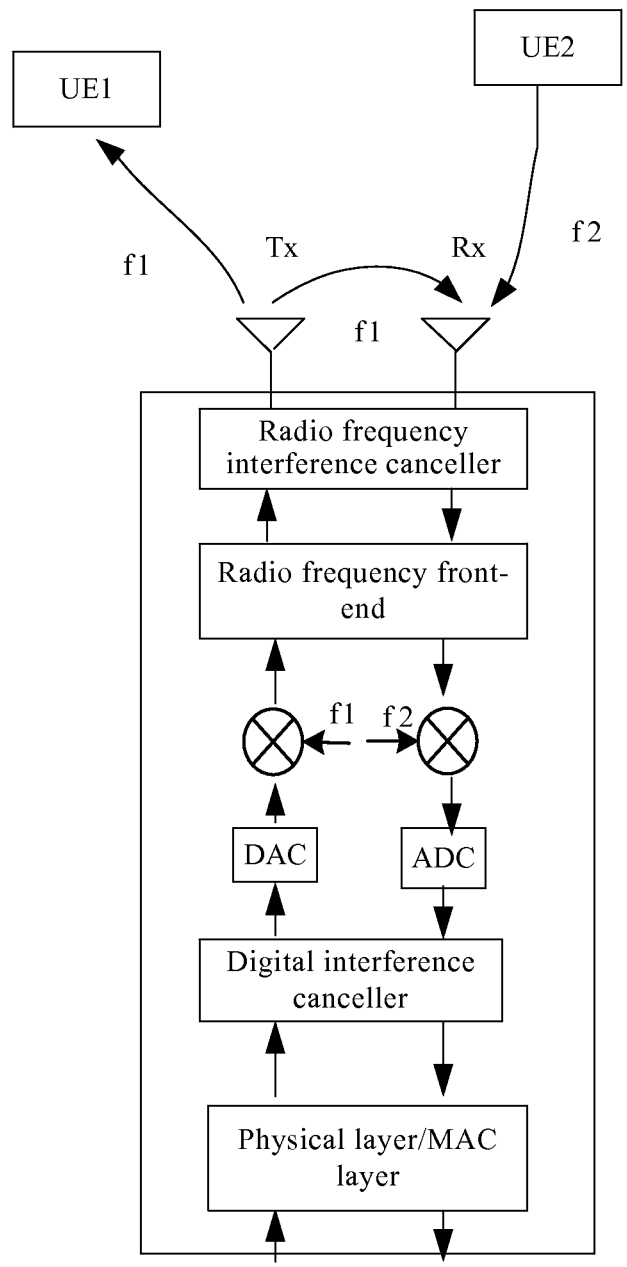
FIG. 4 is an architectural diagram of another system applied in an embodiment of the signal processing method shown in FIG. 2.

FIG. 4 is an architectural diagram of another system applied in an embodiment of the signal processing method shown in FIG. 2. As shown in FIG. 4, a downlink signal that is obtained after a radio frequency interference canceller performs first interference cancellation further carries a remaining self-interference signal of an uplink signal; and after the downlink signal is converted into a digital signal by using an analog-to-digital converter, a digital interference canceller, for example, performs second interference cancellation on a remaining amount of interference of the uplink signal by using an estimated remaining self-interference signal, so that a remaining amount of interference of the uplink signal is less than a second interference threshold. It should be noted that, a principle of the digital interference canceller implementing interference cancellation is similar to that of a radio frequency interference canceller implementing interference cancellation, and is not repeatedly described herein.

It should be noted that, the second interference threshold may be set according to a specific requirement of the system for the interference indicator.

Figure 5:
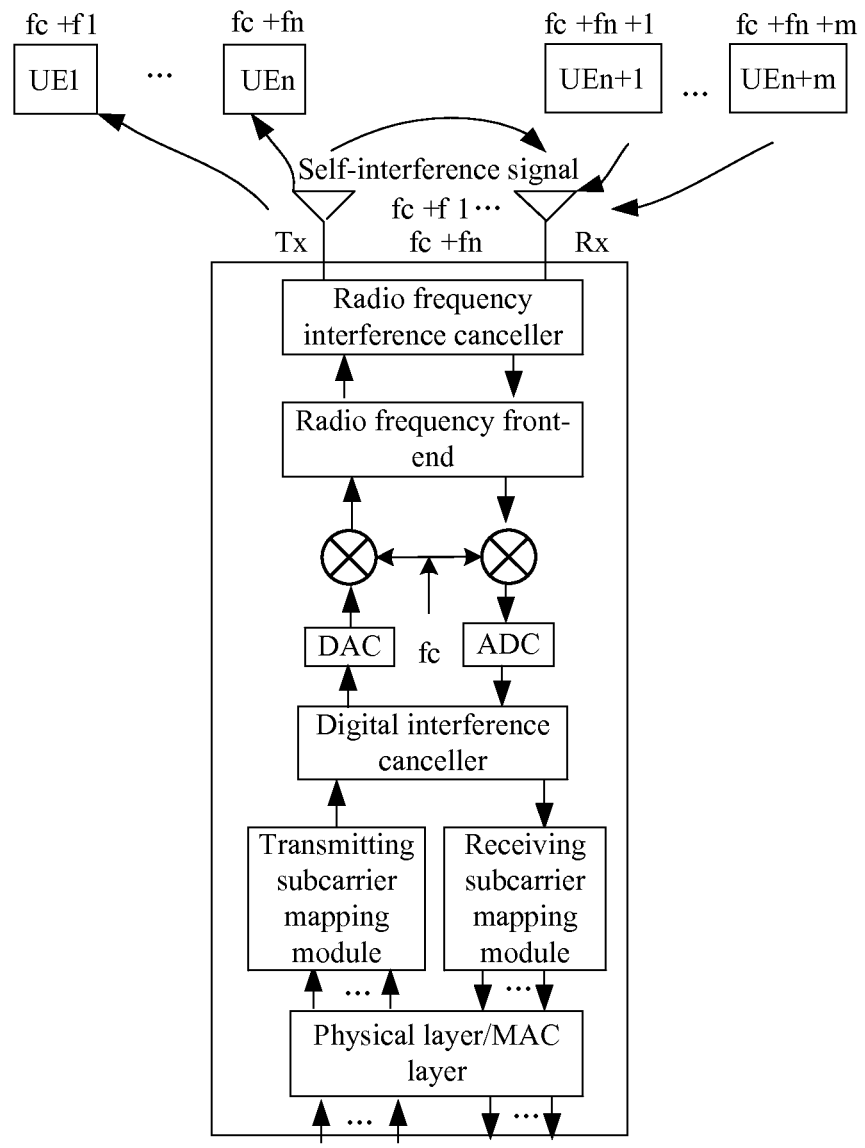
FIG. 5 is an architectural diagram of still another system applied in an embodiment of the signal processing method shown in FIG. 2.

In an optional implementation manner of the present invention, FIG. 5 is an architectural diagram of still another system applied in an embodiment of the signal processing method shown in FIG. 2. As shown in FIG. 5, if a transmitting antenna can transmit an uplink signal of a plurality of frequency bands, or a receiving antenna can receive a downlink signal of a plurality of frequency bands, in this embodiment, different frequency bands can be seen as different subcarriers. This embodiment provides a brand-new duplex manner of dynamic adaptive allocation of uplink and downlink bandwidth. Using an LTE system based on an Orthogonal Frequency Division Multiplexing (OFDM) modulation manner as an example, during specific implementation, as shown in FIG. 5, a physical layer (such as a Media Access Control (MAC) layer) dynamically allocates bandwidth corresponding to uplink and downlink signals according to current uplink and downlink load of the system and/or a type corresponding to uplink and downlink signals and/or channel quality information, for example, dynamically allocates positions of a subcarrier and a resource block (RB) that are corresponding to the uplink and downlink signals.

For example, when the system transmits a plurality of uplink signals, during specific implementation, the physical layer may perform coding and modulation on each of the plurality of uplink signals that are to be transmitted. As shown in FIG. 5, a transmitting subcarrier mapping module maps, according to a position that is of an RB corresponding to each uplink signal and is allocated by the physical layer, each uplink signal that is obtained after the coding and modulation to a corresponding subcarrier, and then performs reverse fast Fourier transform processing.

For another example, when the system receives a plurality of downlink signals, during specific implementation, as shown in FIG. 5, after a radio frequency interference canceller and a digital interference canceller perform interference cancellation on the plurality of downlink signals, a receiving subcarrier mapping module may perform fast Fourier transform processing on each downlink signal; obtain, by reading on a subcarrier corresponding to each downlink signal and according to a position that is of an RB corresponding to each downlink signal and is allocated by the physical layer, each downlink signal from a downlink signal that is obtained after the interference cancellation, and then transmit each downlink signal that is obtained by reading to the physical layer to perform decoding and demodulation.

Figure 6:
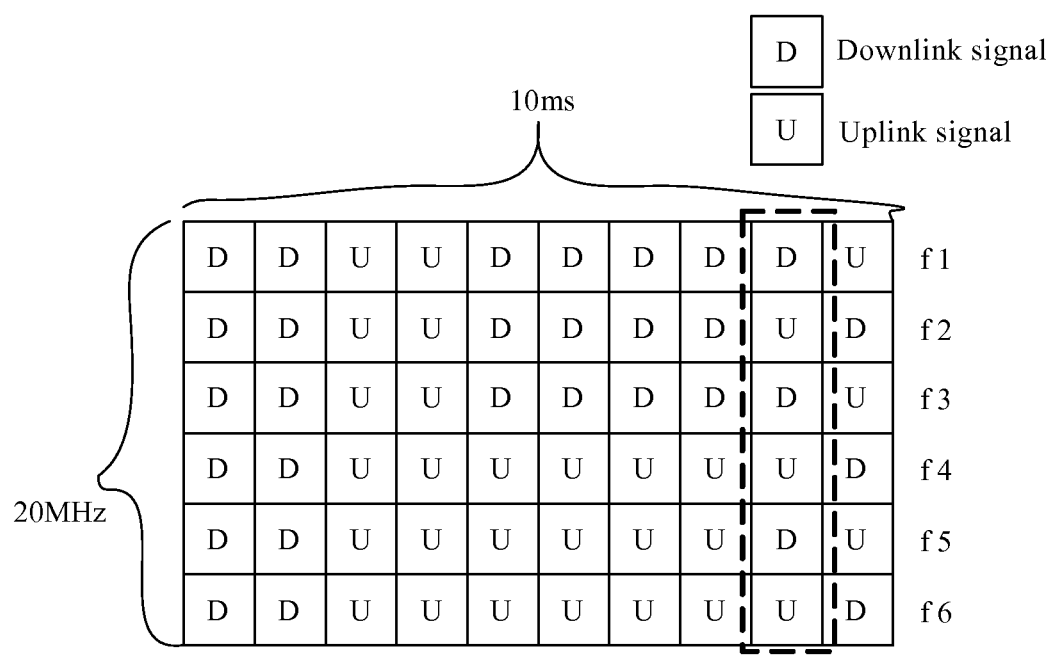
FIG. 6 is a schematic diagram of applying the system shown in FIG. 5 to dynamically allocate uplink and downlink bandwidth in an embodiment of the signal processing method shown in FIG. 2.

FIG. 6 is a schematic diagram of applying the system shown in FIG. 5 to dynamically allocate uplink and downlink bandwidth in an embodiment of the signal processing method shown in FIG. 2. As shown in FIG. 6, for example, there are carriers that are at a total number of six frequencies in a bandwidth of 20 MHz, which are f1-f6 respectively, D represents a downlink signal, U represents an uplink signal, and a physical layer dynamically allocates positions of a subcarrier and an RB that are corresponding to each uplink or downlink signal according to current uplink and downlink load of the system and/or a type corresponding to uplink and downlink signals and/or channel quality information. Using a time point of 1 ms in a dashed block shown in FIG. 6 as an example, after radio frequency interference cancellation and digital interference cancellation are performed, interference between different subcarriers in a downlink signal that is received by a receiving subcarrier mapping module is largely reduced, and therefore, it may be considered that receiving RBs (f2, f4 and f6) are basically not subject to interference of transmitting RBs (f1, f3 and f5). In this way, the downlink signal can be completely obtained by restoration and reading. In a next time point, even if positions of RBs that are allocated to the uplink and downlink signals are different, likewise, an ideal downlink signal can also be obtained by restoration.

Figure 7:
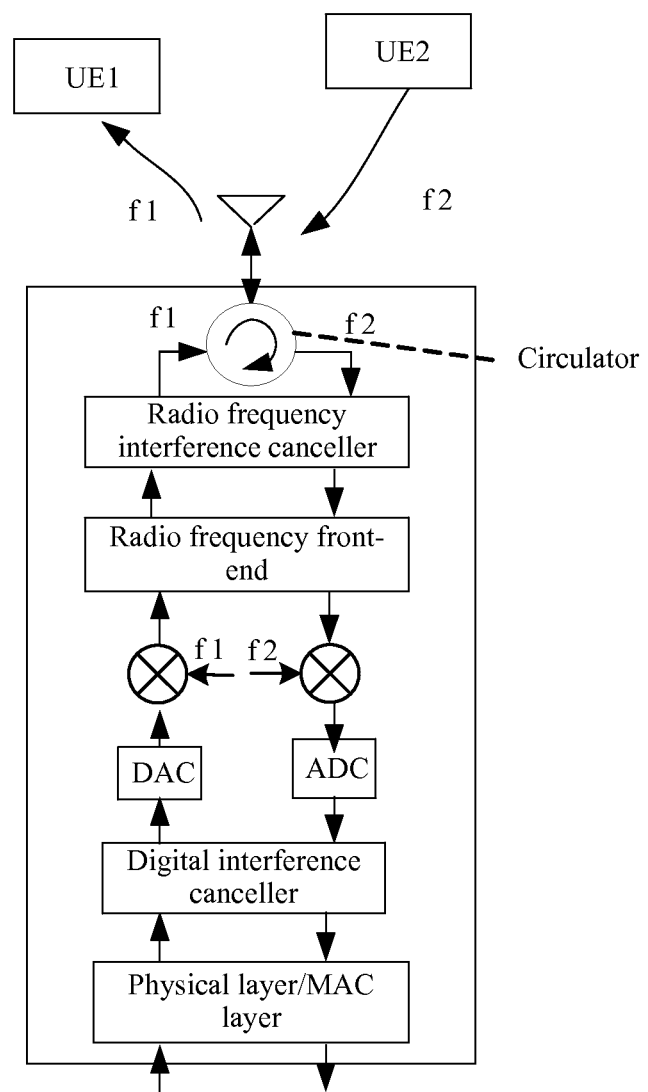
FIG. 7 is an architectural diagram of still another system applied in an embodiment of the signal processing method shown in FIG. 2.

FIG. 7 is an architectural diagram of still another system applied in an embodiment of the signal processing method shown in FIG. 2. As shown in FIG. 7, a circulator is used to converge uplink and downlink signals, and works by using one transceiver antenna, which can reduce system complexity, where an uplink signal transmitted by the transceiver antenna is a signal at one frequency, and a downlink signal received by the transceiver antenna is a signal at another frequency. It should be noted that, according to the signal processing method shown in FIG. 2 that may be adopted by the system shown in FIG. 7, out-of-band interference of an uplink signal on a downlink signal can be minimized. For a specific implementation principle of a radio frequency interference canceller and a digital interference canceller, reference may be made to relevant description of the embodiment shown in FIG. 2, and details are not repeatedly described herein.

Figure 8:
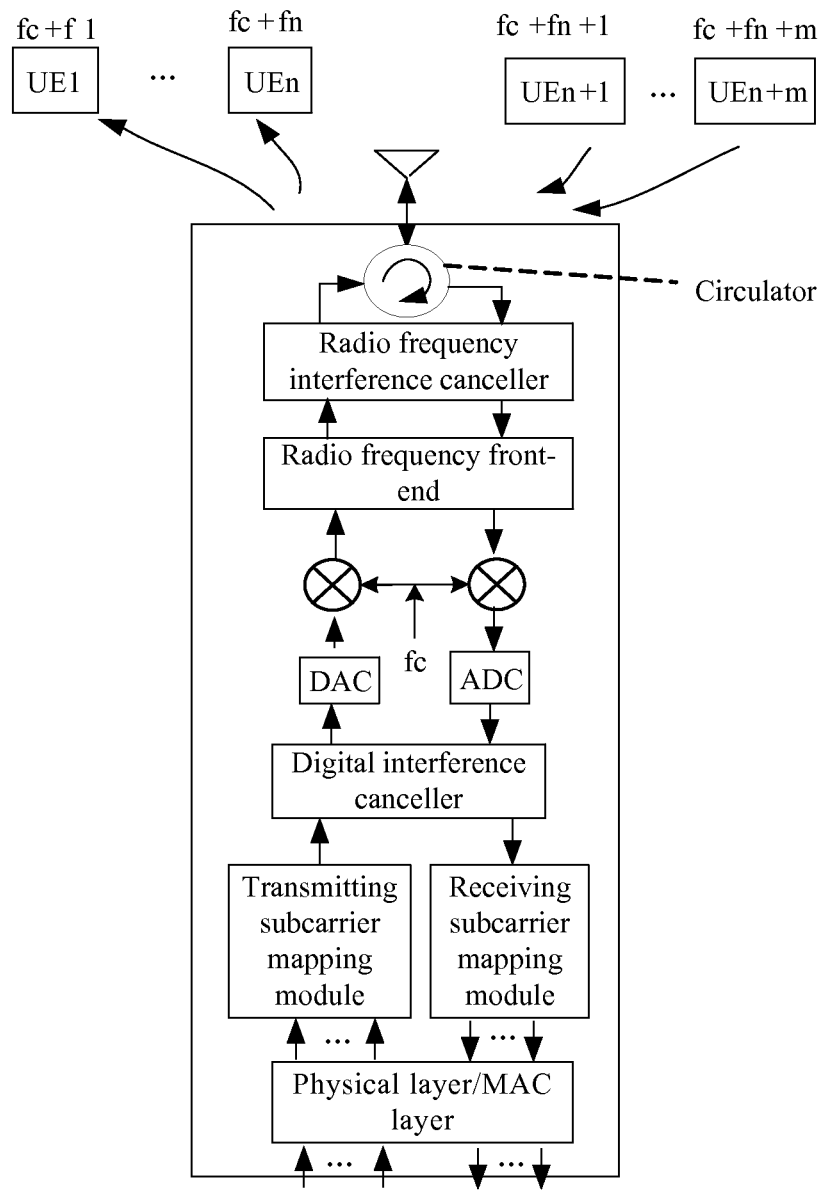
FIG. 8 is an architectural diagram of still another system applied in an embodiment of the signal processing method shown in FIG. 2.

FIG. 8 is an architectural diagram of still another system applied in an embodiment of the signal processing method shown in FIG. 2. As shown in FIG. 8, a circulator is used to converge uplink and downlink signals, and works by using one transceiver antenna, which can reduce system complexity, where the transceiver antenna may transmit a plurality of uplink signals that are at different frequencies, or may also receive a plurality of downlink signals that are at different frequencies. It should be noted that, according to the signal processing method shown in FIG. 2 that may be adopted by the system shown in FIG. 8, out-of-band interference of each uplink signal on each downlink signal can be minimized, and in addition, uplink and downlink bandwidth can be dynamically allocated and adjusted according to current uplink and downlink load of the system and/or a type corresponding to uplink and downlink signals and/or channel quality information. For a specific implementation principle of a radio frequency interference canceller and a digital interference canceller, reference may be made to relevant description of the embodiment shown in FIG. 2; and for a specific implementation principle of a transmitting subcarrier mapping module and a receiving subcarrier mapping module, reference may be made to relevant description of the system shown in FIG. 5, and details are not repeatedly described herein.

In the embodiments of the present invention, according to a technical means that when a downlink signal that carries an uplink signal is received, first interference cancellation is performed on the uplink signal by using an estimated self-interference signal, so that a remaining amount of interference of the uplink signal is less than a first interference threshold, out-of-band interference of the uplink signal on the downlink signal can be minimized without using a plurality of radio frequency front-ends or without using a duplexer on a same radio frequency front-end. In the embodiments of the present invention, no duplexer is adopted, and therefore, difficulty and a cost of base station and system layout can be reduced, and extra energy consumption of a mobile terminal can also be reduced.

In addition, in the embodiments of the present invention, a physical layer can dynamically allocate and adjust uplink and downlink bandwidth according to current uplink and downlink load of a system and/or a type corresponding to uplink and downlink signals and/or channel quality information. However, in a method for separating a transmit signal from a received signal based on a duplexer, the duplexer can be applied only to fixed uplink and downlink bandwidth. Therefore, according to the technical solutions provided in the embodiments of the present invention, out-of-band interference of an uplink signal on a downlink signal can be minimized, and uplink and downlink bandwidth can also be dynamically allocated and adjusted, thereby expanding an application scope of an existing system, and improving application flexibility of the system.

Figure 9:
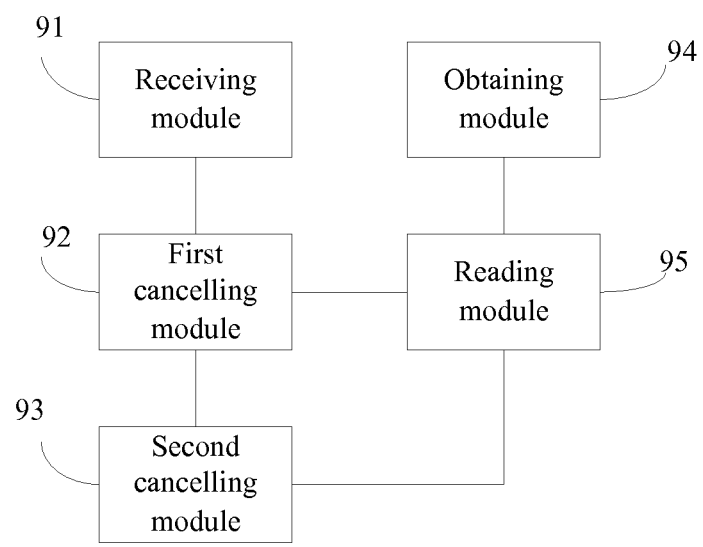
FIG. 9 is a schematic structural diagram of a signal processing apparatus according to another embodiment of the present invention.

FIG. 9 is a schematic structural diagram of a signal processing apparatus according to another embodiment of the present invention. As shown in FIG. 9, the apparatus includes:

a receiving module 91, configured to receive a downlink signal that carries an uplink signal; and a first cancelling module 92, configured to: on a basis of the downlink signal that carries the uplink signal and is received by the receiving module, perform first interference cancellation on the uplink signal by using an estimated self-interference signal, so that a remaining amount of interference of the uplink signal is less than a first interference threshold.

In an optional implementation manner of the present invention, the signal processing apparatus further includes:

a second cancelling module 93, configured to: on a basis that the first cancelling module performs the first interference cancellation on the uplink signal by using the estimated self-interference signal, perform second interference cancellation on the remaining amount of interference of the uplink signal by using an estimated remaining self-interference signal, so that a remaining amount of interference of the uplink signal is less than a second interference threshold.

In an optional implementation manner of the present invention, when a system receives a plurality of downlink signals, the signal processing apparatus further includes:

an obtaining module 94, configured to obtain positions of a subcarrier and a resource block RB that are corresponding to each downlink signal, where the positions of the subcarrier and the resource block RB that are corresponding to each downlink signal are dynamically allocated by a physical layer according to current uplink and downlink load of the system and/or a type corresponding to uplink and downlink signals and/or channel quality information; and a reading module 95, configured to obtain, by reading on a subcarrier corresponding to each downlink signal and according to a position, which is obtained by the obtaining module, of a resource block RB corresponding to each downlink signal, each downlink signal from a downlink signal that is obtained after the first cancelling module or the second cancelling module performs interference cancellation.

In an optional implementation manner of the present invention, a function of the first cancelling module 92 may be implemented, for example, by using the radio frequency interference canceller described in the foregoing embodiments; a function of the second cancelling module 93 may be implemented, for example, by using the digital interference canceller described in the foregoing embodiments; and functions of the obtaining module 94 and the reading module 95 may be implemented, for example, by using the receiving subcarrier mapping module described in the embodiment shown in FIG. 5 or FIG. 8.

It should be noted that, the signal processing apparatus in this embodiment may further include another obtaining module, for example, when a system transmits a plurality of uplink signals, the another obtaining module is configured to obtain positions of a subcarrier and a resource block RB that are corresponding to each uplink signal, where the positions of the subcarrier and the resource block RB that are corresponding to each uplink signal are dynamically allocated by the physical layer according to current uplink and downlink loads and/or a type corresponding to uplink and downlink signals and/or channel quality information; and the signal processing apparatus in this embodiment may further include a mapping module, configured to map each uplink signal to a corresponding subcarrier according to the positions, which are obtained by the another obtaining module, of the subcarrier and the resource block RB that are corresponding to each uplink signal, and then perform reverse fast Fourier transform processing. Functions of the another obtaining module and the mapping module may be implemented by using the transmitting subcarrier mapping module described in the embodiment shown in FIG. 5 or FIG. 8.

In the embodiment of the present invention, according to a technical means that when a downlink signal that carries an uplink signal is received, first interference cancellation is performed on the uplink signal by using an estimated self-interference signal, so that a remaining amount of interference of the uplink signal is less than a first interference threshold, out-of-band interference of the uplink signal on the downlink signal can be minimized without using a plurality of radio frequency front-ends or without using a duplexer on a same radio frequency front-end. In the embodiment of the present invention, no duplexer is adopted, and therefore, difficulty and a cost of base station and system layout can be reduced, and extra energy consumption of a mobile terminal can also be reduced.

In addition, in the embodiment of the present invention, a physical layer can dynamically allocate and adjust uplink and downlink bandwidth according to current uplink and downlink load of a system and/or a type corresponding to uplink and downlink signals and/or channel quality information. However, in a method for separating a transmit signal from a received signal based on a duplexer, the duplexer can be applied only to fixed uplink and downlink bandwidth. Therefore, according to the technical solution provided in the embodiment of the present invention, out-of-band interference of an uplink signal on a downlink signal can be minimized, and uplink and downlink bandwidth can also be dynamically allocated and adjusted, thereby expanding an application scope of an existing system, and improving application flexibility of the system.

Another embodiment of the present invention provides a communications device, including but not limited to a device such as a base station or a mobile terminal, where the base station includes the signal processing apparatus described in the embodiment shown in FIG. 9, and the mobile terminal includes the signal processing apparatus described in the embodiment shown in FIG. 9. For specific description of the signal processing apparatus, reference may be made to relevant content of the corresponding embodiment in FIG. 9, and details are not repeatedly described herein.

Another embodiment of the present invention provides a communications system, including but not limited to a device such as a base station or a mobile terminal, where the base station includes the signal processing apparatus described in the embodiment shown in FIG. 9, and the mobile terminal includes the signal processing apparatus described in the embodiment shown in FIG. 9. For specific description of the signal processing apparatus, reference may be made to relevant content of the corresponding embodiment in FIG. 9, and details are not repeatedly described herein.

A person skilled in the art can clearly understand that, for convenience and brevity of description, for a detailed working process of the foregoing system, apparatus, and units, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, the unit dividing is merely logical function dividing, and there may be other dividing manners in actual implementation. For example, a plurality of units or components may be combined or integrated into another system, or some features may be ignored or not executed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts shown as units may or may not be physical units, that is, may be located in one position, or may also be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may also be implemented in a form of hardware plus a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disc, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A signal processing method for a base station, comprising:
   receiving, by the base station, a downlink signal that carries an uplink signal;
   performing, by the base station, first interference cancellation on the carried uplink signal of the received downlink signal by using an estimated self-interference signal, so that a remaining amount of interference of the carried uplink signal of the received downlink signal is less than a first interference threshold in order to reduce out-of-band interference of the carried uplink signal, the first interference cancellation on the carried uplink signal of the received downlink signal being performed by a radio frequency interference canceller, which uses the estimated self-interference signal;
   converting the received down link signal into a digital signal by an analog-to-digital converter, wherein the digital downlink signal carries a remaining self-interference signal of the carried uplink signal; and
   performing, by using a digital interference canceller, second interference cancellation on the remaining self-interference signal of the carried uplink signal that is obtained after the first interference cancellation, so that the remaining amount of interference of the remaining self-interference signal of the carried uplink signal is less than a second interference threshold, wherein the digital interference canceller applies an estimated remaining self-interference signal to perform the second interference cancellation.

2. The method according to claim 1, wherein the method for the base station further comprises: obtaining positions of a subcarrier and a resource block RB that are corresponding to the downlink signal, wherein the positions of the subcarrier and the resource block RB that are corresponding to the downlink signal are dynamically allocated by a physical layer according to at least one of current uplink and downlink load, a type corresponding to uplink and downlink signals and channel quality information corresponding to uplink and downlink signals; and obtaining, by reading on the subcarrier corresponding to the downlink signal and according to the position of the resource block RB corresponding to the downlink signal, the downlink signal from a downlink signal that is obtained after the first or the second interference cancellation.

3. The method according to claim 1, wherein the base station performs the first interference cancellation without a duplexer.

4. A base station, comprising:
   at least one memory comprising instructions and at least one hardware processor to execute the instructions within the at least one memory to implement:
   receiving a downlink signal that carries an uplink signal;
   performing first interference cancellation on the carried uplink signal of the received downlink signal by using an estimated self-interference signal, so that a remaining amount of interference of the carried uplink signal of the received downlink signal is less than a first interference threshold in order to reduce out-of-band interference of the carried uplink signal, the first interference cancellation on the carried uplink signal of the received downlink signal being performed by a radio frequency interference canceller, which uses the estimated self-interference signal;
   converting the received down link signal into a digital signal by an analog-to-digital converter, wherein the digital downlink signal carries a remaining self-interference signal of the carried uplink signal; and
   performing, by using a digital interference canceller, second interference cancellation on the remaining self-interference signal of the carried uplink signal that is obtained after the first interference cancellation, so that the remaining amount of interference of the remaining self-interference signal of the carried uplink signal is less than a second interference threshold, wherein the digital interference canceller applies an estimated remaining self-interference signal to perform the second interference cancellation.

5. The base station according to claim 4, wherein the at least one memory further comprises executable instructions to implement: obtaining positions of a subcarrier and a resource block RB that are corresponding to the downlink signal, wherein the positions of the subcarrier and the resource block RB that are corresponding to the downlink signal are dynamically allocated by a physical layer according to at least one of current uplink and downlink load, a type corresponding to uplink and downlink signals and channel quality information corresponding to uplink and downlink signals; and obtaining, by reading on the subcarrier corresponding to the downlink signal and according to the position of the resource block RB corresponding to the downlink signal, the downlink signal from a downlink signal that is obtained after the first interference cancellation or the second interference cancellation.

6. The base station according to claim 4, wherein a radio frequency interference canceller performs first interference cancellation on the carried uplink signal by using the estimated self-interference signal, so that the remaining amount of interference of the carried uplink signal is less than the first interference threshold.

7. The base station according to claim 4, wherein a digital interference canceller performs second interference cancellation on the remaining amount of interference of the carried uplink signal by using the estimated remaining self-interference signal, so that the remaining amount of interference of the carried uplink signal is less than the second interference threshold.

8. The base station according to claim 4, wherein the base station performs the first interference cancellation without a duplexer.

9. A signal processing method for a mobile terminal, comprising:
   receiving, by the mobile terminal, a downlink signal that carries an uplink signal;
   performing, by the mobile terminal, first interference cancellation on the carried uplink signal of the received downlink signal by using an estimated self-interference signal, so that a remaining amount of interference of the carried uplink signal of the received downlink signal is less than a first interference threshold in order to reduce out-of-band interference of the carried uplink signal, the first interference cancellation on the carried uplink signal of the received downlink signal being performed by a radio frequency interference canceller, which uses the estimated self-interference signal;
   converting the received down link signal into a digital signal by an analog-to-digital converter, wherein the digital downlink signal carries a remaining self-interference signal of the carried uplink signal; and
   performing, by using a digital interference canceller, second interference cancellation on the remaining self-interference signal of the carried uplink signal that is obtained after the first interference cancellation, so that the remaining amount of interference of the remaining self-interference signal of the carried uplink signal is less than a second interference threshold, wherein the digital interference canceller applies an estimated remaining self-interference signal to perform the second interference cancellation.

10. The method according to claim 9, wherein the method for the mobile terminal further comprises: obtaining positions of a subcarrier and a resource block RB that are corresponding to the downlink signal, wherein the positions of the subcarrier and the resource block RB that are corresponding to the downlink signal are dynamically allocated by a physical layer according to at least one of current uplink and downlink load, a type corresponding to uplink and downlink signals and channel quality information corresponding to uplink and downlink signals; and obtaining, by reading on the subcarrier corresponding to the downlink signal and according to the position of the resource block RB corresponding to the downlink signal, the downlink signal from a downlink signal that is obtained after the first or the second interference cancellation.

11. The method according to claim 9, wherein the mobile terminal performs the first interference cancellation without a duplexer.

12. A mobile terminal, comprising:
at least one memory comprising instructions and at least one hardware processor to execute the instructions within the at least one memory to implement:
receiving a downlink signal that carries an uplink signal;
performing first interference cancellation on the carried uplink signal of the received downlink signal by using an estimated self-interference signal, so that a remaining amount of interference of the carried uplink signal of the received uplink signal is less than a first interference threshold in order to reduce out-of-band interference of the carried uplink signal, the first interference cancellation on the carried uplink signal of the received downlink signal being performed by a radio frequency interference canceller, which uses the estimated self-interference signal;
converting the received down link signal into a digital signal by an analog-to-digital converter, wherein the digital downlink signal carries a remaining self-interference signal of the carried uplink signal; and
performing, by using a digital interference canceller, second interference cancellation on the remaining self-interference signal of the carried uplink signal that is obtained after the first interference cancellation, so that the remaining amount of interference of the remaining self-interference signal of the carried uplink signal is less than a second interference threshold, wherein the digital interference canceller applies an estimated remaining self-interference signal to perform the second interference cancellation.

13. The mobile terminal according to claim 12, wherein the at least one memory further comprises executable instructions to implement: obtaining positions of a subcarrier and a resource block RB that are corresponding to the downlink signal, wherein the positions of the subcarrier and the resource block RB that are corresponding to the downlink signal are dynamically allocated by a physical layer according to at least one of current uplink and downlink load, a type corresponding to uplink and downlink signals and channel quality information corresponding to uplink and downlink signals; and obtaining, by reading on the subcarrier corresponding to the downlink signal and according to the position of the resource block RB corresponding to the downlink signal, the downlink signal from a downlink signal that is obtained after the first interference cancellation or the second interference cancellation.

14. The mobile terminal according to claim 12, wherein a radio frequency interference canceller performs first interference cancellation on the carried uplink signal by using the estimated self-interference signal, so that the remaining amount of interference of the carried uplink signal is less than the first interference threshold.

15. The mobile terminal according to claim 12, wherein a digital interference canceller performs second interference cancellation on the remaining amount of interference of the carried uplink signal by using the estimated remaining self-interference signal, so that the remaining amount of interference of the carried uplink signal is less than the second interference threshold.

16. The mobile terminal according to claim 12, wherein the mobile terminal performs the first interference cancellation without a duplexer.

* * * * *